United States Patent [19]

Föhl

[11] Patent Number: 4,549,704

[45] Date of Patent: Oct. 29, 1985

[54] COUPLING DEVICE FOR THE WINDING SHAFT OF A SAFETY BELT ROLL-UP DEVICE WITH RETIGHTENING DEVICE

[75] Inventor: Artur Föhl, Auf der Halde, Fed. Rep. of Germany

[73] Assignee: Repa Feinstanzwerk GmbH, Schorndorf, Fed. Rep. of Germany

[21] Appl. No.: 526,558

[22] Filed: Aug. 25, 1983

[30] Foreign Application Priority Data

Aug. 26, 1982 [DE] Fed. Rep. of Germany ....... 3231807

[51] Int. Cl.⁴ ...................... A62B 35/02; B65H 75/48
[52] U.S. Cl. ............................... 242/107; 242/107.4 R
[58] Field of Search ...................... 242/107, 107.4 RE; 280/806; 297/478, 480

[56] References Cited

U.S. PATENT DOCUMENTS 4,191,344  3/1980  Tillac .................................. 242/107
4,423,846  1/1984  Fohl .................................... 242/107
4,444,010  4/1984  Bendler .............................. 242/107

Primary Examiner—John M. Jillions
Attorney, Agent, or Firm—Yount & Tarolli

[57] ABSTRACT

Coupling system for the winding shaft of a safety belt with a retightening device, with flexible tension means which is in functional connection with a driving device, for instance, a power accumulator, and with a tension means roll connected to the shaft to be driven. The tension means is looped around the tension means roll firmly connected to the shaft to be driven, with radial play preferably several times. The free end section of the tension means is subjected by a brake element to a predetermined braking force. Upon activation of the driving device, the looping section of the tension means is contracted and is coupled by the loop friction to the tension means roll.

22 Claims, 12 Drawing Figures

COUPLING DEVICE FOR THE WINDING SHAFT OF A SAFETY BELT ROLL-UP DEVICE WITH RETIGHTENING DEVICE

BACKGROUND OF THE INVENTION

1. Field of the Invention

The invention relates to a coupling device for the winding shaft of a safety belt with a retightening device, with flexible tension means which is in functional connection with a driving device, for instance a power accumulator, and with a tension means roll connected to the shaft to be driven.

2. Description of the Prior Art

In one known retightener for automatic safety belt winding devices with a power accumulator which can be released in the event of a crash as well as with an energy converter which acts on the belt shaft of the automatic winding device after the power accumulator is released and causes the former to execute a rotary retightening motion, a rotatable tension means roll is provided as the energy converter. This tension means roll can be coupled to the belt shaft such that, after the sensor-controlled activation of the power accumulator, the tension means are moved, for instance by a lifting cylinder, together with the tension means roll connected thereto. This tension means roll moves rolling bodies radially inward after shear pins are sheared off by a motion relative to the belt shaft and brings them into clamping and coupling engagement with the belt shaft. In normal operation, the tension means roll is therefore decoupled from the belt shaft and must execute a coasting rotation, if activated, for the purpose of coupling. The design of this known coupling device is relatively elaborate and must be relatively strong, with relatively large moving masses.

SUMMARY OF THE INVENTION

An object of the invention is to provide a coupling device for the winding shaft of a safety belt with a retightening device, with flexible tension means which is in functional connection with a driving device, for instance, a power accumulator, and with a tension means roll connected to the shaft to be driven, of simple mechanical design, in which only very small masses need to be moved during the coupling process and in which, in particular, the coupling process takes place within an extremely short time.

With the foregoing and other objects in view, there is provided in accordance with the invention a coupling system for coupling a winding shaft of a safety belt with belt retightening device which comprises a winding shaft on which a safety belt may be wound and unwound, a retightening device for rotating the shaft in the belt wind-up direction to tighten the belt having a tension means roll firmly connected to the shaft, a flexible tension means which is in functional connection with a driving device and with the tension means roll connected to the shaft to be driven, said tension means looped with radial play around the tension means roll firmly connected to the shaft, a brake element for subjecting a section of the tension means after the loop as a free end to a predetermined braking force, said driving device upon activation effecting contraction of the looping section of the tension means and coupling by the loop friction to the tension means roll.

Other features which are considered as characteristic for the invention are set forth in the appended claims.

Although the invention is illustrated and described herein as embodied in a coupling device for the winding shaft of a safety belt roll-up device with retightening device, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which.

DETAILED DESCRIPTION OF THE INVENTION

Figure 1:
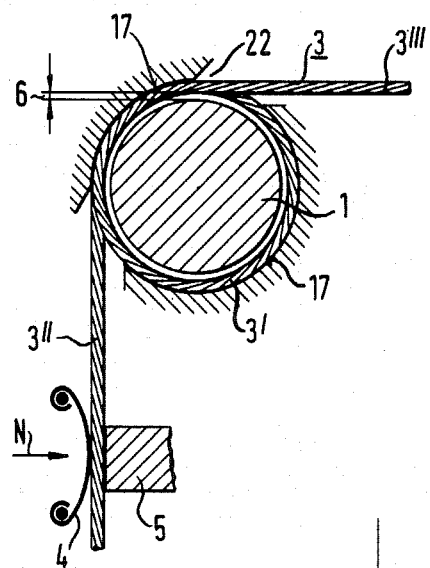
FIGS. 1 and 2 show schematic cross-sectional views of the coupling device according to the invention in the unactuated normal position (FIG. 1) and in the activated position (FIG. 2).

According to the invention, the coupling system of winding shaft with retightening device with flexible tension means, driving device and tension roll has the features (a) the tension means is looped, preferably several times, with radial play, around the tension means roll, (b) the free end section of the tension means is subjected by a brake element to a predetermined braking force, and (c) upon activation of the driving device, the looping section of the tension means is contracted and is coupled by the loop friction to the tension means roll.

The tension means which are used in the invention and are arranged in a special way, has three functions, namely, the tension means function proper, i.e., the transmission of forces from a drive device, for instance, from a pyrotechnical drive or a spring drive, to the shaft to be driven; then the coupling function, i.e., the mechanical connection between the moving pulling means and the shaft to be driven at the instant of activation; and not the least, a braking function which makes the coupling operation possible. The free, unfastened end section of the tension means may be loaded by a simple compression spring to reach a predetermined braking force. This braking force prevents unimpeded run-off of the tension means and causes the looped section of the tension means to constrict and enter with the circumferential surface of the tension means roll into coupled connection caused by the loop friction between the tension means and the surface of the tension means roll. As a result, the tension means roll rotates immediately and causes, for instance, a retightening of the safety belt. Through the loop friction, which obeys the law $e^{\mu}\alpha$, a pulling-off force of 1800 kg can be transmitted with a friction coefficient of $\mu=0.4$, $Si=1$ kg and three full loops, where Si is the holding-back force or braking force and S2 the pulling-off force. While of extremely simple design, the coupling device according to the invention works almost without inertia and therefore, fast. The drive, i.e., the rotation of the shaft to be driven, continues until the free end section is no longer subjected to the braking force.

In one preferred embodiment the invention is characterized by the features that the tension means consist of an elastically flexible material; that it is supported by this intrinsic tension with the looping section in a cage surrounding the tension means roll, with spacing from the tension means roll; and that the free end section of the tension means is installed with pre-tension in bent and preferably spiral shaped channels fixed to the housing. The last-mentioned channels form the braking element, in which the tension means are supported in these channels under pretension, and a predetermined braking force is exerted on the running-out tension means by friction on the channel walls. Special braking springs or the like are unnecessary here.

Advantageously, the cage like recess as well as the channels can be part of a single housing. The manufacture of the housing as well as the assembly is simplified by the provision that the recess as well as the channels are freely accessible from the housing side. Further, the channels are designed as grooves or slots, open on one side, and worked into the housing, into which the free end section of the tension means can be inserted from one side without difficulty.

To prevent the tension means helices looped around the tension means roll from giving way, the recess, defined on both sides by ring-shaped shoulders, is formed as a slot in a further embodiment of the invention.

According to a further advantageous embodiment of the invention, the feedthrough between the recess and the channels is shaped so that an additional braking torque is exerted on the tension means. For instance, a projection extending beyond the normal tension means path can be provided in the feedthrough, against which the tension means slide with increased friction.

It is further advantageous to provide the circumferential surface of the tension means roll with a friction lining, for instance, with a plastic or rubber coating.

The invention will be explained in the following with the aid of embodiment examples shown in the drawings.

Figure 2:
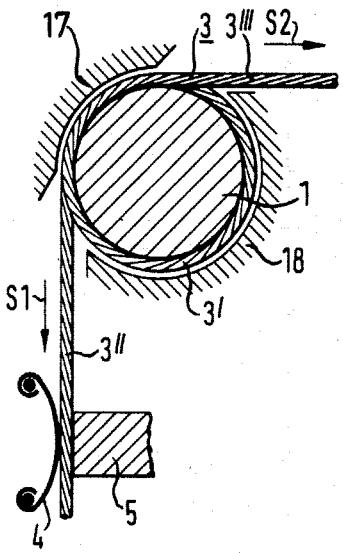
Figure 3:
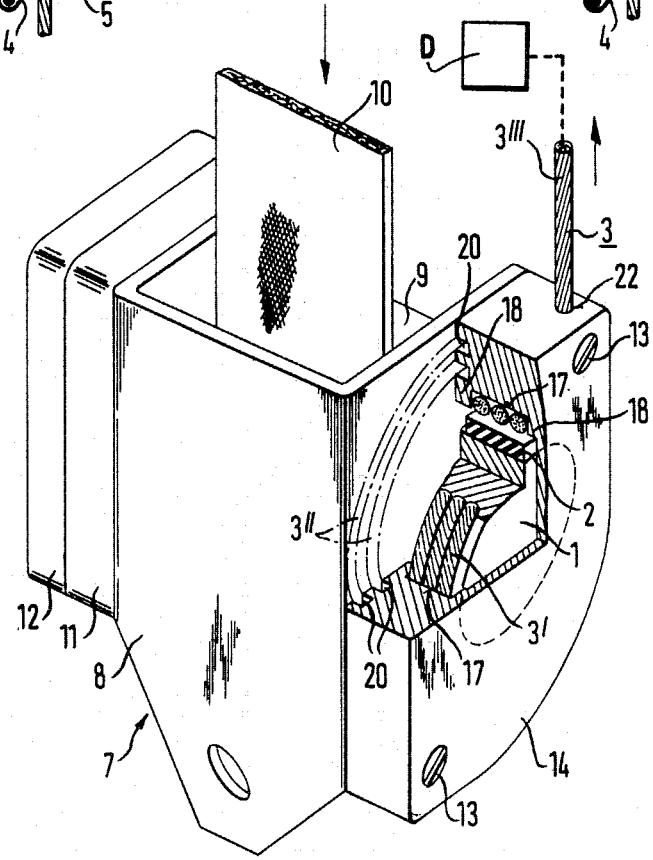
FIG. 3 shows a perspective view of a safety belt roll-up device with a built-on coupling device according to the invention, which differs in details from the coupling device according to FIGS. 1 and 2.
Figure 4:
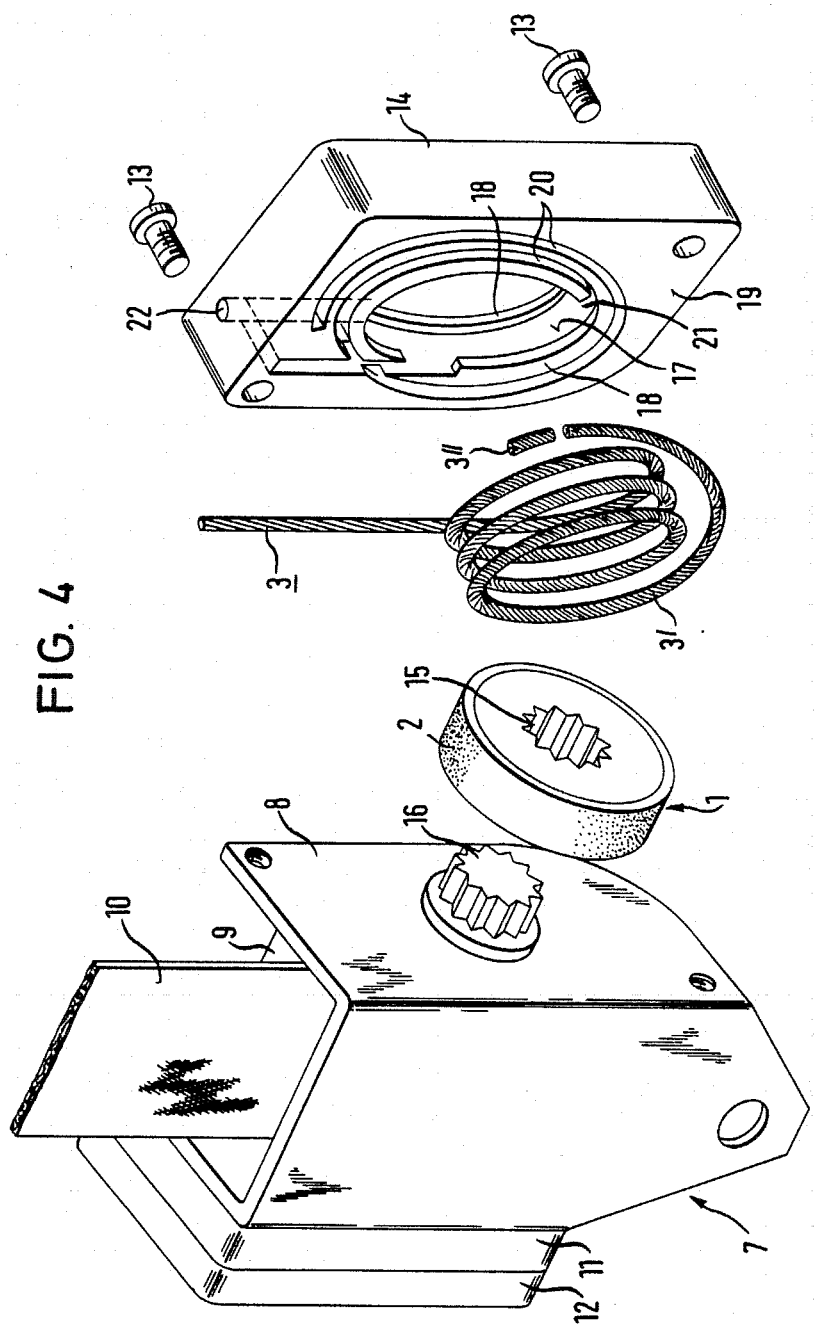
FIG. 4 is an exploded view of the coupling device in connection with the safety belt roll-up device according to FIG. 3.

In the embodiment example according to FIGS. 1 and 2, as well as in the embodiment example according to FIGS. 3 and 4, is shown a pulley-like tension means roll 1, which, according to FIG. 4, is provided at the circumference with a rubber-like covering 2. This tension means roll 1 is directly connected firmly to a shaft to be driven; in the case of the embodiment example according to FIGS. 3 and 4 with a wind-up shaft of a safety belt roll-up device. An elastic tension means 3 is looped around the circumferential surface of the tension means roll 1 several times. The elastic tension means 3 consists of an elastically flexible material and is made preferably in the form of a steel cable. The tension means 3 is looped around the tension means roll 1 with a looping section 3' and has a free end section 3''. The other end of the looping section 3' is provided with a braking element in the form of a spring 4 with abutment 5 (FIG. 1). The spring 4 pushes the tension means 3'' against the abutment 5 with a predetermined pressure, thus presenting a predetermined braking force to the withdrawal of the tension means 3. The tension means 3 further has a section 3''' which is connected to a driving device D, not shown in detail, for instance, to the drive or lifting element of a sensor-controlled power accumulator which may, for example, take the form of a known pyrotechnical drive. FIG. 1 shows the non-actuated position of the coupling device, in which no coupling connection exists between the tension means 3 and the tension means roll 1. As will be noted, a clearance 6 exists between the inside circumference of the tension means 3' and the circumferential surface of the tension means roll 1, i.e., the tension means 3' is looped around the tension means roll 1 with radial play. If now a pulling force is exerted on the tension means 3 in the direction of the arrow S2 due to activation of the drive device D, the looping section 3' is contracted, i.e., constricted to cause intimate or close contact with the surface of the tension means roll 1. This is made possible by the braking force N which is active at the end section 3''. With contact of the tension means 3' at the outer circumference of the tension means roll 1, the coupling connection proper takes place due to the loop friction according to the law $e^{\mu}\alpha$. With a further pull at the tension means 3, a strong friction contact is caused between the tension means 3 and the tension means roll 1 via the above-mentioned effect with the result that the tension means roll 1 and thereby the shaft to be driven, are instantaneously set in rotation, i.e., are taken along. The drive continues until the end section 3'' leaves the action range of the braking device 4, and therefore, frictional contact between the tension means 3 and the tension means roll 1 no longer exists. The activated position of the coupling device is illustrated in FIG. 2. Very large forces can be transmitted via this coupling connection, and very advantageous transmission ratios between S1 and S2 can be obtained with a corresponding large friction coefficient $\mu_2$ of, for instance, 0.4 of the friction lining 2, according to $S1=\mu_1 \times N$ and $S2=S1\times e^{\mu_2}\alpha$, where $\mu_2$ is the friction coefficient of the tension means roll surface and the tension means and the loop angle at the loop section 3'.

A particularly simple mechanical design of the coupling device in connection with a known safety belt roll-up device 7 is shown in FIGS. 3 and 4. As is known, the supporting part of the safety belt roll-up device 7 is a U-shaped frame 8, at which a winding shaft 9 is rotatably supported, on which a flexible belt 10 is wound. On the one side of the winding shaft 9 and the frame 8 is disposed a sensor-controlled ratchet device 11 within a suitable housing. Adjacent to device 11 within a cover 12, is a rewinding spring which is connected to the winding shaft 9. A housing 14 is arranged on the other side of the winding shaft 9 and the frame 8, or fastened by means of screws 13 to the free leg of the frame. The pulley-like tension means roll 1 is arranged inside the housing 14. Roll 1 is provided with internal gearing 15 which can be pushed onto external gear teeth 16 at the winding shaft 9 to be driven, whereby the tension means roll 1 and the winding shaft 9 are connected securely to each other to prevent rotation relative to one another. A cage- or capsule-like recess 17 to receive the tension means roll 1, is provided in the interior of the housing 14. The cage or recess 17 has a ring-like support surface which is concentric with the tension means roll and is bounded on both sides by ring-like shoulders 18 and is, therefore, designed in the shape of a slot open toward the inside. This recess 17 or the corresponding concentric support surface is likewise designated by numeral 17 in the embodiment example according to FIGS. 1 and 2. As is shown particularly in FIG. 4, the recess 17 is freely accessible from one side of the housing 14, i.e., it is completely open toward that side. As likewise shown in FIGS. 3 and 4a, spiral-shaped slot-like channel 20 is formed in or machined into the wall 19 of the housing 14 facing the free leg of the frame 8, with the innermost channel section having a larger diameter than the recess 17. The inside width of the helical channel is slightly larger than the thickness of the tension means 3 designed as a steel cable. At its radially innermost end the channel 20 opens into the recess 17 to form a feedthrough for the tension means 3 at a location 21 so that the tension means 3 may pass in tangential relationship from the channel 20 into the recess 17. A hole 22 in the housing 14 which leads to the outside, opens tangentially into the recess 17 and serves to bring the tension means section 3''' to the driving device, not shown, according to FIG. 1. In the embodiment example according to FIGS. 1 and 2, the recess 17 is interrupted at this point for forming this hole or a corresponding passage gap for the tension means 3, as is shown in the figures. In assembling the coupling device, the tension means 3 designed as a steel cable is first brought through the hole 22, whereupon the looping section 3' is wound and placed in the recess 17. By the intrinsic tension of the tension means material, this looping section 3' of the tension means rests against the ring-like support surface of the recess 17 with pre-tension, this looping section 3' being prevented from jumping out of the recess 17 by the lateral shoulders 18. Then, the end section 3'' is placed in the helical channel 20, in which the tension means 3 is again braced against the channel wall with mechanical pre-tension. The tension means 3 pass through the tangential feedthrough at the point 21 between the recess 17 and the channel 20. The thus assembled housing 14 is placed on the side plate of the frame 8 and fastened thereto by means of the screws 13. In this position, the looping section 3' is located at a radial distance from the circumferential surface of the tension means roll 1, as is clearly shown in FIG. 3 and is also indicated in FIG. 1. In this non-actuated normal position, the winding shaft 9 can be rotated unimpeded for freely winding and unwinding the belt 10. In the case of activation, for instance, in the event of a crash, i.e., if the ratchet device 11 locks the winding shaft 9, the driving device D, for instance, the pyrotechnical propulsion set, is released simultaneously and the tension means 3 is pulled out of the housing 14 at the section 3''' in the direction of the arrow according to FIGS. 2 and 3. The already described effect takes place, i.e., the looping section 3' is put in contact with the tension means roll 1 through constriction of loop 3', which is made possible by the braking force at the end section 3'' of the tension means 3. In the embodiment example according to FIGS. 3 and 4, the friction force by which the elastic tension means 3 is braced against the channel walls of the helical channel 20 serves here as the braking element instead of the spring 4 according to FIG. 1. This friction force is opposed to the pulling-off force and aids in the above-described constriction of the looping section 3''. The coupling process is completed with the constriction and the torque starting from the driving device is transmitted without delay to the winding shaft 9 which rotates instantly and causes a retightening of the belt 10.

Figure 5A:
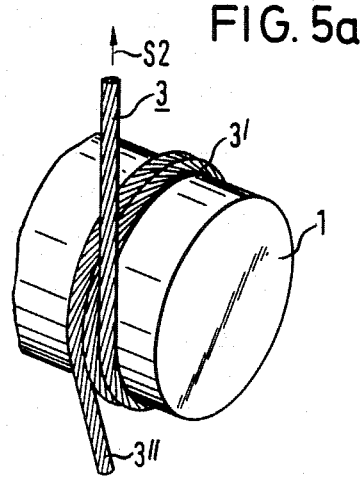
FIGS. 5 and 5a show schematically a cylindrical tension means roll with a looping section in a perspective view and a top view.
Figure 5B:
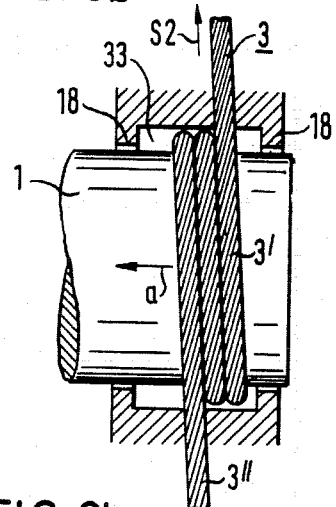

As is shown particularly in FIG. 3, the looping section 3' is relatively narrow in the above-described embodiment example and is arranged without appreciable axial play between the shoulders 18 which are fixed relative to the housing. If the coupling device is activated, i.e., if the tension means 3 is pulled out in the direction of the arrow, the tension means 3, as a flexible cable, travels in accordance with the cable pitch of the looping section 3' in the arrow direction a according to FIG. 5b. For example, in the embodiment example according to FIG. 3, the tension means 3 travels in the direction of the inner shoulder 18, where it runs up on the shoulder 18 which is fixed relative to the housing and comes to a stop, and this friction with stationary shoulder 18 together with undesired friction forces impede free rotation of the tension means roll 1. For this purpose, sufficient axial clearance 33 is provided in the embodiment example according to FIGS. 5a and 5b on the tension means roll 1 between the axial limits on the housing side, i.e., the shoulders 18 and the looping section 3', at least in the direction of the arrow a, to prevent the tension means 3 from touching the shoulder 18 in its axial movement or travel in the direction of the arrow a, for instance, for one or two revolutions of the tension means roll 1, up to the completion of the retightening motion.

Figure 6A:
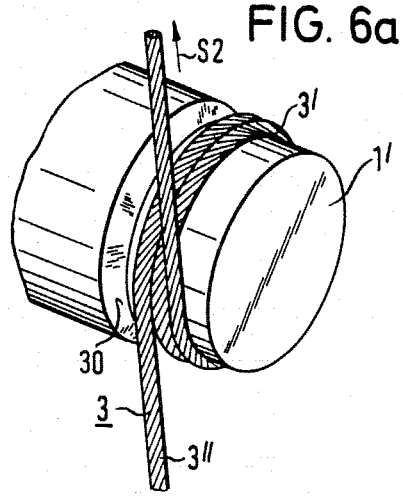
FIGS. 6a and 6b show another embodiment of the tension means roll in a perspective view and a top view.
Figure 6B:
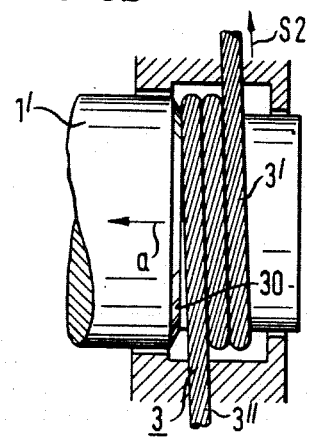

The embodiment examples according to FIGS. 6 and 7 show an arrangement for use in which such a clearance is not desirable or possible for space reasons, i.e., to provide a device of compact design. In the embodiment example according to FIGS. 6a and 6b, the tension means roll 1' has in the axial direction a a radial shoulder 30 which is bevelled in wedge-fashion. This radial shoulder 30 forms a stop for the tension means 3 which moves axially during the unwinding process, and limits the travel motion of the tension means 3. Due to the flexibility and resiliency of the tension means, no appreciable axial pressure action on the tension means roll 1', i.e., no axial shift of the tension means roll 1' itself occurs.

Figure 7A:
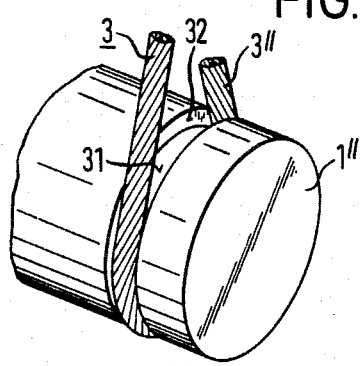
FIGS. 7a and 7b show a further embodiment of the tension means roll in a perspective view and top view.
Figure 7B:
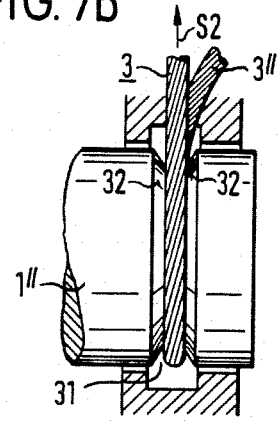
Figure 8:
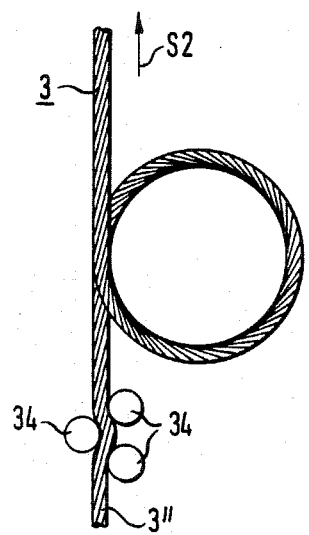
FIGS. 8 and 9 are schematic views showing two variants of a braking device for the tension means.
Figure 9:

In the embodiment example according to FIGS. 7a and 7b, the tension means roll 1'' has a circular wedge groove 31 with radial shoulders 32 which are related to each other in V-fashion. The mean distance of the radial shoulders 32 corresponds approximately to the thickness, i.e., the cable thickness of the tension means 3. Here, the looping section consists only of approximately one tension means loop, as shown particularly in FIG. 7a. The single-layer loop section rests against the V-shaped radial shoulders 32, and brings about a sufficiently large loop friction. In the above-described figures, the direction is indicated by S2, in which the tension means 3 is pulled off from the tension means roll 1 when the driving device is activated. The other tension means section 3'' is subjected to a braking force if the system is activated. FIGS. 8 and 9 show how such brake elements can be designed. In FIG. 8, the tension means 3 at the tension means section 3'' passes a braking device, representing a baffle, for instance, three brake elements 34 in the form of stationary pins or the like, and is deformed at this point and is thereby braked. In FIG. 9 such a brake element can take the form of a curved guide 35 for the tension means 3.

I claim:

1. A coupling system for coupling a winding shaft of a safety belt with a belt retightening device which comprises a winding shaft on which a safety belt may be wound and unwound, a retightening device for rotating the shaft in the belt wind-up direction to tighten the belt having a tension means roll firmly connected to the shaft, a flexible tension means which is connected with a driving device and with the tension means roll connected to the shaft to be driven, said tension means looped with radial play around the tension means roll firmly connected to the shaft, a brake element for subjecting a section of the tension means after the loop as a free end to a predetermined braking force, said driving device upon activation effecting contraction of the looping section of the tension means and coupling by the loop friction to the tension means roll.

2. Coupling system according to claim 1, wherein the tension means looping section has a plurality of turns.

3. Coupling system according to claim 1, wherein a housing supports the winding shaft; wherein the tension means consists of an elastically flexible material; wherein the looping section is braced by its intrinsic tension in a cage spaced from and surrounding the tension means roll; and wherein the free end section of the tension means is inserted with pre-tension in curved a channel in the cage.

4. Coupling system according to claim 1 wherein the tension means roll is surrounded by a housing which has a cage-like recess concentric with the roll axis for the tension means looping section; wherein the radial distance from the roll circumference to the housing is slightly larger than the thickness of the tension means; wherein the housing further has helical channels for the tension means end section; and wherein between the recess and the channels a feedthrough is provided for passage of the tension means.

5. Coupling system according to claim 4, wherein the recess is shaped like a slot, bounded on both sides by ring-like shoulders.

6. Coupling system according to claim 4, wherein the housing has a hole leading tangentially into the recess for the tension means section connected to the driving device.

7. Coupling system according to claim 4, wherein the feedthrough between the recess and the channels is designed to provide for exerting an additional braking torque on the tension means.

8. Coupling system according to claim 1, wherein the circumferential surface of the tension means roll is provided with a friction lining.

9. Coupling system according to claim 4, wherein the circumferential surface of the tension means roll is provided with a friction lining.

10. Coupling system according to claim 1, wherein the tension means is a steel cable.

11. Coupling system according to claim 3, wherein the tension means is a steel cable.

12. Coupling system according to claim 1, wherein the tension means roll has at least one radial shoulder which is arranged in the direction of the winding pitch of the tension means and limits an axial motion of the looping section of the tension means on the tension means roll, if the tension means is driven.

13. Coupling system according to claim 12, wherein the tension means roll has a circular wedge groove with mutually opposite radial shoulders.

14. Coupling system according to claim 13, wherein the mean distance of the radial shoulders corresponds approximately to the thickness of the tension means and wherein the looping section consists only of almost one loop turn of the tension means.

15. Coupling system according to claim 1, wherein the looping section of the tension means has sufficient clearance in the axial direction on the tension means roll and the axial boundaries on the housing side to avoid being impeded and coming to a stop in its axial motion.

16. Coupling system according to claim 3, wherein the looping section of the tension means has sufficient clearance in the axial direction on the tension means roll and the axial boundaries on the housing side to avoid being impeded and coming to a stop in its axial motion.

17. Coupling system according to claim 1 wherein the free end section of the tension means is guided between rigid brake elements and is deformed, and is thereby subjected to a braking force.

18. An apparatus for tightening a safety belt, said apparatus comprising a rotatable member around which the safety belt is wound, a roll connected to said member for rotation therewith, a flexible cable wrapped around said roll, and means to move said cable from a first condition in which said member and roll are freely rotatable relative to said cable to a second condition in which said cable firmly grips said roll and is movable to impart rotation to said roll and member in a direction to wind the safety belt on said member.

19. An apparatus as set forth in claim 18 wherein said cable has first and second end portions and an intermediate portion disposed between said end portions and wrapped around said roll, said intermediate portion of said cable being spaced from said roll when said cable is in the first condition, said intermediate portion of said cable being firmly pressed against said roll when said cable is in the second condition.

20. An apparatus as set forth in claim 19 wherein said cable moving means includes drive means connected with the first end portion of said cable for moving said cable from the first condition to the second condition, said drive means being operable to pull on said first end portion of said cable to move the intermediate portion of said cable into engagement with said roll and to rotate said roll and member under the influence of force transmitted to said roll from said cable, said second end portion of said cable being free to move relative to said roll during rotation of said roll by said drive means.

21. An apparatus as set forth in claim 20 wherein said intermediate portion of said cable includes a plurality of turns which extend completely around said roll.

22. An apparatus as set forth in claim 20 wherein said intermediate portion of said cable includes only a single turn which does not extend completely around said roll.

* * * * *